United States Patent
Chen et al.

(10) Patent No.: US 8,415,852 B2
(45) Date of Patent: Apr. 9, 2013

(54) MOTOR STATOR

(75) Inventors: Chien-Jung Chen, Kaohsiung (TW); Hsien-Wen Liu, Kaohsiung (TW); Chih-Tsung Hsu, Kaohsiung (TW); Tzu-Wen Tsai, Kaohsiung (TW); Cheng-Tien Shih, Pingtung County (TW); Hsin-Hsien Wu, Kaohsiung (TW); Jia-Ching Lee, Kaoshsiung (TW)

(73) Assignee: Yen Sun Technology Corp. (TW)

( * ) Notice: Subject to any disclaimer, the term of this patent is extended or adjusted under 35 U.S.C. 154(b) by 248 days.

(21) Appl. No.: 13/074,659

(22) Filed: Mar. 29, 2011

(65) Prior Publication Data

US 2012/0119608 A1 May 17, 2012

(30) Foreign Application Priority Data

Nov. 12, 2010 (TW) ................ 99138990 A (51) Int. Cl.
  *H02K 3/04* (2006.01)
(52) U.S. Cl.
  USPC ............................................. 310/208; 310/71

(58) Field of Classification Search ................ 310/71, 310/67 R, 208, 254.1
See application file for complete search history.

(56) References Cited

U.S. PATENT DOCUMENTS

| | | | |
|---|---|---|---|
| 2003/0020353 A1* | 1/2003 | Lopatinsky et al. | 310/208 |
| 2003/0124001 A1* | 7/2003 | Chen | 417/356 |
| 2004/0084980 A1* | 5/2004 | Yamaguchi et al. | 310/81 |
| 2005/0057112 A1* | 3/2005 | Lopatinsky et al. | 310/208 |
| 2005/0285470 A1* | 12/2005 | Itoh et al. | 310/208 |
| 2006/0091747 A1* | 5/2006 | Yamaguchi et al. | 310/81 |
| 2007/0273218 A1* | 11/2007 | Atkinson | 310/45 |
| 2008/0018187 A1* | 1/2008 | Yamaguchi et al. | 310/81 |
| 2010/0237728 A1* | 9/2010 | Saito et al. | 310/71 |
| 2011/0127940 A1* | 6/2011 | Lee et al. | 318/400.39 |
| 2011/0133589 A1* | 6/2011 | Bi et al. | 310/156.01 |

\* cited by examiner

*Primary Examiner* — Thanh Lam
(74) *Attorney, Agent, or Firm* — Banner & Witcoff, Ltd.

(57) ABSTRACT

A motor stator includes a stator unit and at least one auxiliary unit. The stator unit includes a circuit substrate, and a plurality of spaced-apart induction coils embedded within the circuit substrate. The auxiliary unit includes an auxiliary coil attached to and disposed outwardly of the circuit substrate.

9 Claims, 8 Drawing Sheets

MOTOR STATOR

CROSS-REFERENCE TO RELATED APPLICATION

This application claims priority of Taiwanese Application No. 099138990, filed on Nov. 12, 2010.

BACKGROUND OF THE INVENTION

1. Field of the Invention

This invention relates to a driving device, and more particularly to a motor stator.

2. Description of the Related Art

Figure 1:
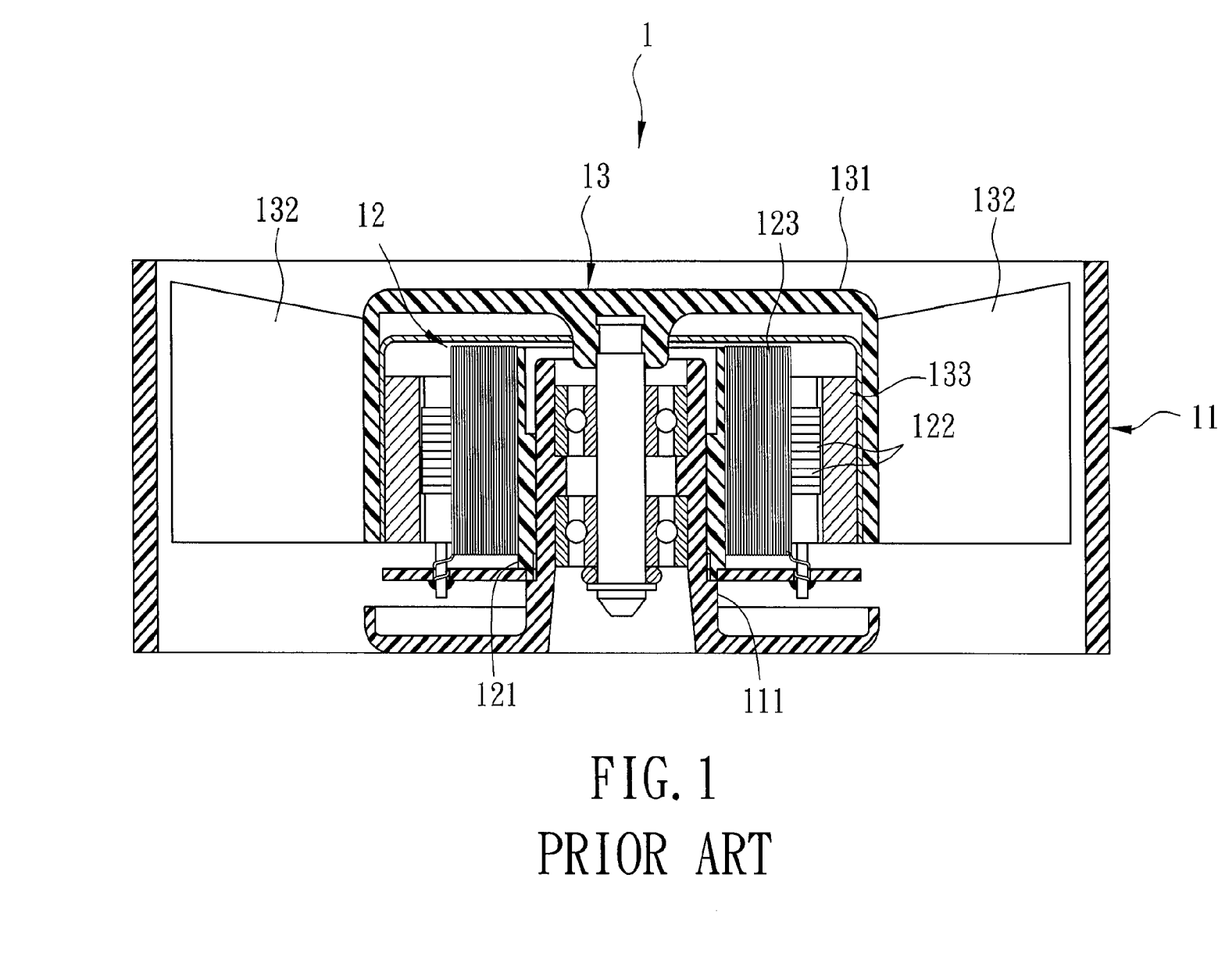
FIG. 1 is a sectional view of one conventional motor stator.

Referring to FIG. 1, a conventional heat-dissipating fan 1 includes an outer housing 11, a stator 12 disposed on the outer housing 11, and a rotor 13 disposed pivotally on the outer housing 11.

The outer housing 11 includes a tubular shaft 111. The stator 12 includes a stator frame 121 sleeved on the shaft 111, a plurality of superposed silicone steel sheets 122 fixed on the stator frame 121, and a plurality of induction coils 123 wound around the stator frame 121.

The rotor 13 includes a hub 131 disposed rotatably on the shaft 111 for covering the stator 12, a plurality of blades 132 extending outwardly from an outer peripheral surface of the hub 131, and a ring-shaped magnet 133 disposed fixedly on an inner peripheral surface of the hub 131 and spaced apart from and disposed around the stator 12.

When the induction coils 123 are energized, a repulsive magnetic force is created between the ring-shaped magnet 133 and the silicone steel sheets 122 to drive rotation of the ring-shaped magnet 133 and, thus, the rotor 13 relative to the stator 12.

Since both the silicone steel sheets 122 and the induction coils 123 are disposed on the stator frame 121, the stator 12 of the heat-dissipating fan 1 is relatively high (i.e., thick), thereby limiting the applicable range of the fan 1.

A thin motor stator has been proposed to solve the applicable range problem of the aforesaid conventional heat-dissipating fan 1. For example, referring to FIG. 2, in a thin fan disclosed in Taiwanese Patent Publication No. 1332058, a bearing 21, a hub 22, an iron-contained metallic sheet 23, and a magnet 24 are integrated to constitute a rotating member 20. The rotating member 20 is driven by a coil circuit board 25 embedded with a plurality of coil windings 251. As such, the height of the fan is reduced to increase the applicable range of the fan.

Figure 2:
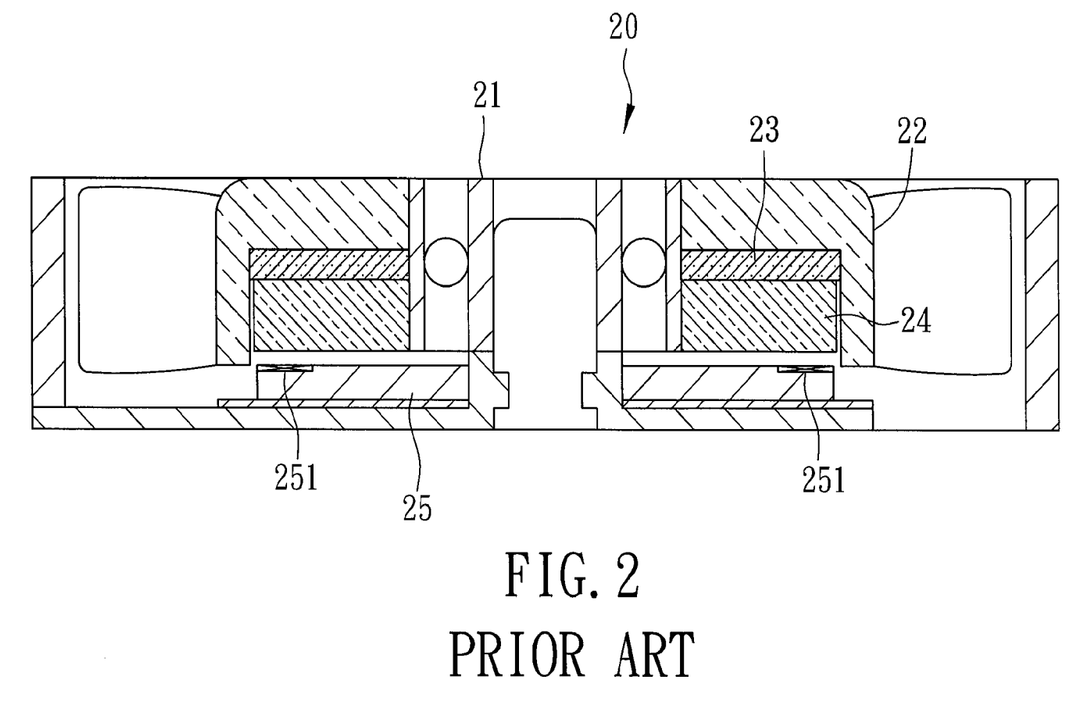
FIG. 2 is a sectional view of another conventional motor stator disclosed in Taiwanese Patent Publication No. 1332058.

As well known in the art that, the more the turn numbers of the coil windings 251, the more the intensity of the magnetic field generated after the coil windings 251 are energized. However, since the area of the coil circuit board 25 is relative small, the turn numbers of the coil windings 251 are limited so that, when the coil windings 251 are energized, the magnetic field intensity thus generated is small. As a consequence, the rotational speed of the hub 22 is also small, thereby resulting in difficulties when driving rotation of the hub 22.

SUMMARY OF THE INVENTION

The object of this invention is to provide a thin motor stator that includes coils, the total turn number of which can be increased effectively.

According to this invention, a motor stator includes a stator unit and at least one auxiliary unit. The stator unit includes a circuit substrate, and a plurality of spaced-apart induction coils embedded within the circuit substrate. The auxiliary unit includes an auxiliary coil attached to and disposed outwardly of the circuit substrate.

As such, since the auxiliary coil is exposed outwardly of the circuit substrate, the turn number of the auxiliary coil is not limited by the area and thickness of the circuit substrate, and can be increased significantly to improve a driving force of the motor stator to thereby promote the performance of a motor incorporating the motor stator.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Before the present invention is described in greater detail in connection with the preferred embodiments, it should be noted that similar elements and structures are designated by like reference numerals throughout the entire disclosure.

Figure 3:
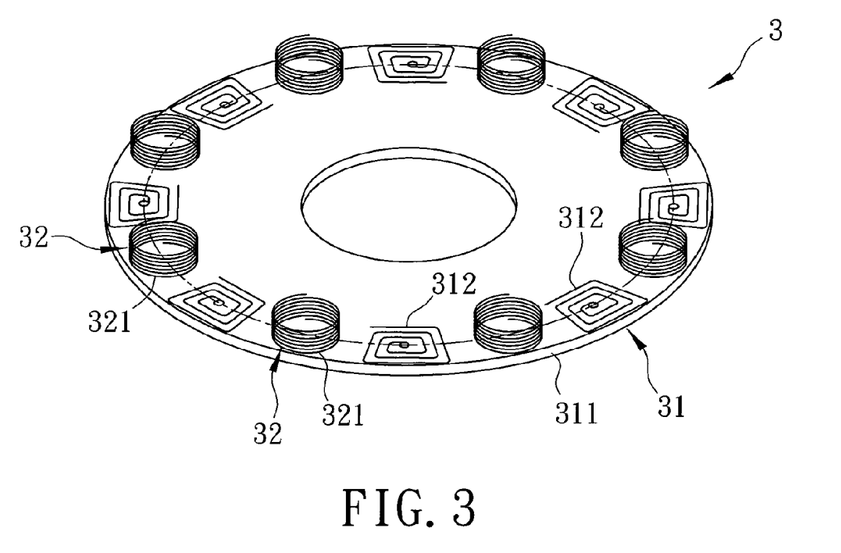
FIG. 3 is a perspective view of the first preferred embodiment of a motor stator according to this invention.
Figure 4:
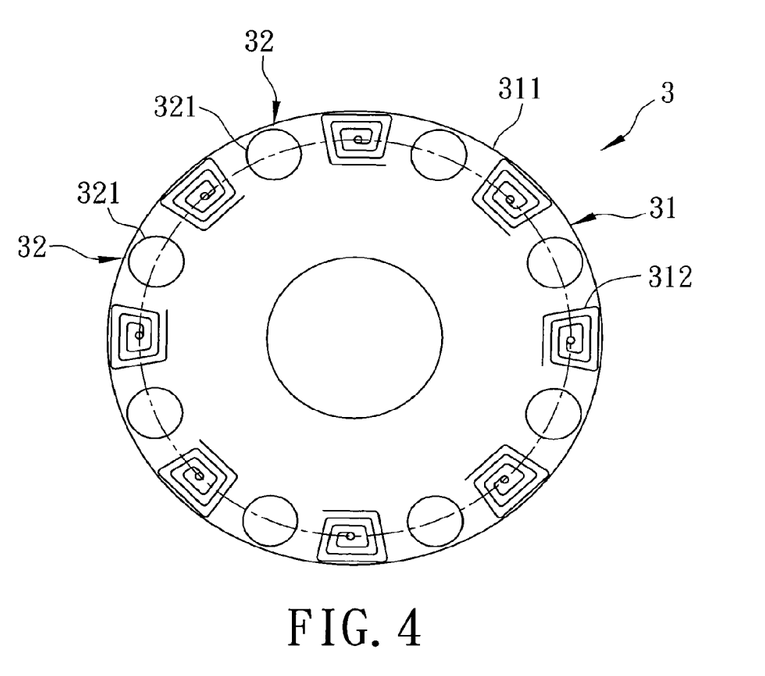
FIG. 4 is a top view of the first preferred embodiment.

Referring to FIGS. 3 and 4, the first preferred embodiment of a motor stator 3 according to this invention includes a stator unit 31 and a plurality of auxiliary units 32 disposed on the stator unit 31. The stator unit 31 includes a circuit substrate 311 and a plurality of spaced-apart induction coils 312 embedded within the circuit substrate 311.

In this embodiment, the number of the induction coils 312 is but not limited to eight, and the induction coils 312 are angularly equidistant, and are configured as enameled wires. The number of the induction coils 312 may be increased or reduced.

The auxiliary units 32 correspond respectively to the induction coils 312. Each of the auxiliary units 32 includes an auxiliary coil 321 attached to a side surface of the circuit substrate 311. Each of the induction coils 321 of the auxiliary units 32 is configured as an enameled wire, and is electrically connected to the induction coils 312.

Alternatively, the auxiliary coils 321 are electrically insulated from the induction coils 312, and are electrically connected to an independent power source (not shown).

In this embodiment, the number of the auxiliary coils 32 is but not limited to eight. The auxiliary coil 321 of each of the auxiliary units 3 is disposed between two adjacent ones of the induction coils 312. That is, the auxiliary coils 321 of the induction coils 312 are arranged alternately with induction coils 312. The auxiliary coils 321 are electrically connected to the induction coils 312 by conductive lines extending along a circle shown by the phantom lines in FIG. 4.

Figure 5:
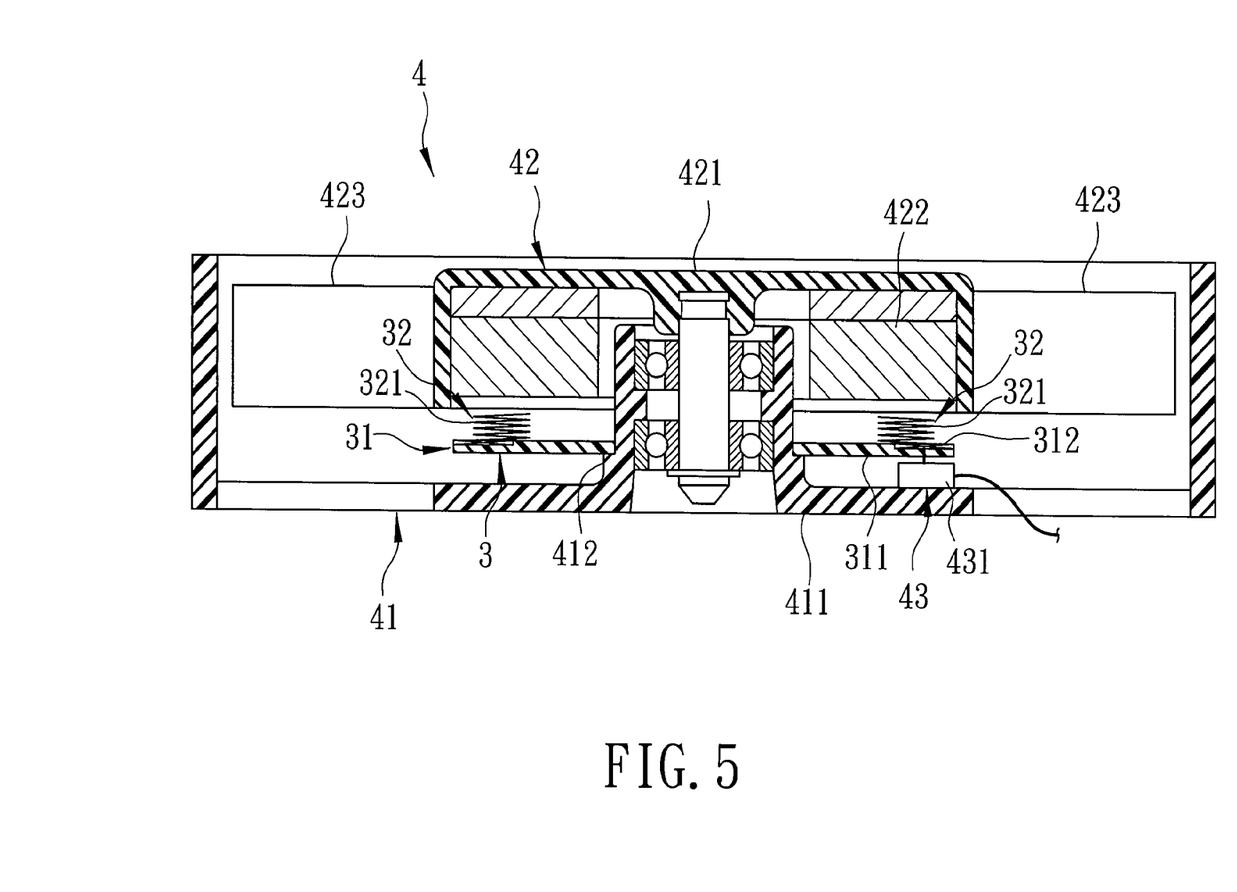
FIG. 5 is a sectional view of a heat-dissipating fan incorporating the first preferred embodiment.

Referring to FIG. 5, the motor stator 3 is used on a heat-dissipating fan 4. The fan 4 includes a base 41, a rotor unit 42, and a power supply unit 43.

The base 41 includes a main body 411, and a tubular shaft 412 extending upwardly from a central portion of the main body 411. The rotor unit 42 includes a hub 421 disposed pivotally on the shaft 412, a ring-shaped magnet 422 disposed fixedly and coaxially within the hub 421, and a plurality of spaced-apart blades 423 extending outwardly from an outer peripheral surface of the hub 421.

The circuit substrate 311 of the motor stator 3 is disposed fixedly on the shaft 412. The induction coils 312 and the auxiliary coils 321 of the auxiliary unit 32 are disposed under the ring-shaped magnet 422. The power supply unit 43 includes a driving power source 431 that is electrically connected to the induction coils 312 and the auxiliary coils 321.

When the driving power 431 is turned on, the induction coils 312 and the auxiliary coils 321 are energized, such that electric current flows in the induction coils 312 and the auxiliary coils 321, thereby generating a repulsive magnetic force for driving rotation of the ring-shaped magnet 422 and, thus, both the hub 421 and the blades 423.

Since the auxiliary coils 321 are disposed outwardly of the circuit substrate 311, the turn numbers of the auxiliary coils 321 are not limited by the area and thickness of the circuit substrate 311. Furthermore, since each of the auxiliary coils 321 of the auxiliary units 32 is located between two adjacent ones of the induction coils 312, when the motor stator 3 is energized, not only the induction coils 312 but also the auxiliary coils 321 form eight magnetic poles. That is, the magnetic pole number is increased to enhance the repulsive magnetic force to thereby increase the rotational speed of the hub 421 and promote the heat dissipation effect of the blades 423.

Figure 6:
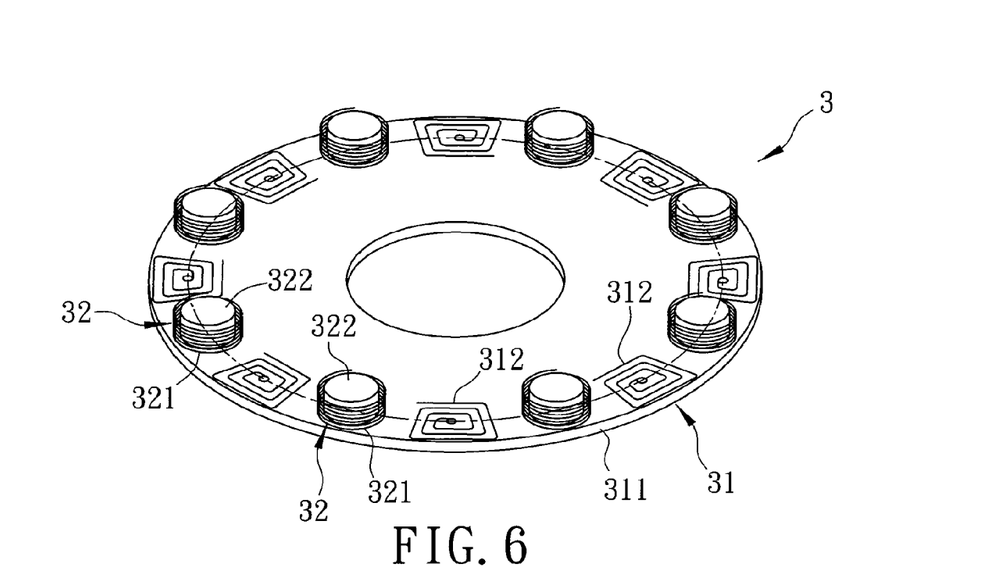
FIG. 6 is a perspective view of the second preferred embodiment of a motor stator according to this invention.

FIG. 6 shows the second preferred embodiment of a motor stator 3 according to this invention, which is different from the first preferred embodiment in that each of the auxiliary units 32 further includes a conductive rod 322 disposed fixedly on and perpendicular to the side surface of the circuit substrate 311 and permitting the corresponding auxiliary coil 321 to be wound therearound.

Since this embodiment is similar in construction to the first preferred embodiment, it can achieve the same effect as the first preferred embodiment. With inclusion of the rods 322, the auxiliary coils 321 can be mounted accurately and conveniently to the circuit substrate 311.

Figure 7:
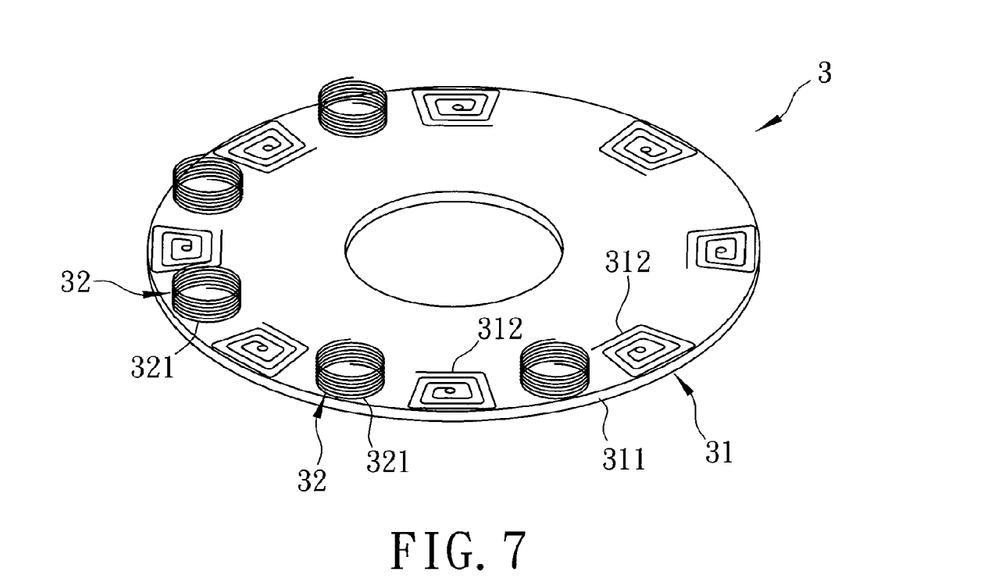
FIG. 7 is a perspective view of the third preferred embodiment of a motor stator according to this invention.

FIG. 7 shows the third preferred embodiment of a motor stator 3 according to this invention, which is similar in construction to the first preferred embodiment. The difference resides in that the number of the auxiliary units 32 is reduced to four.

Figure 8:
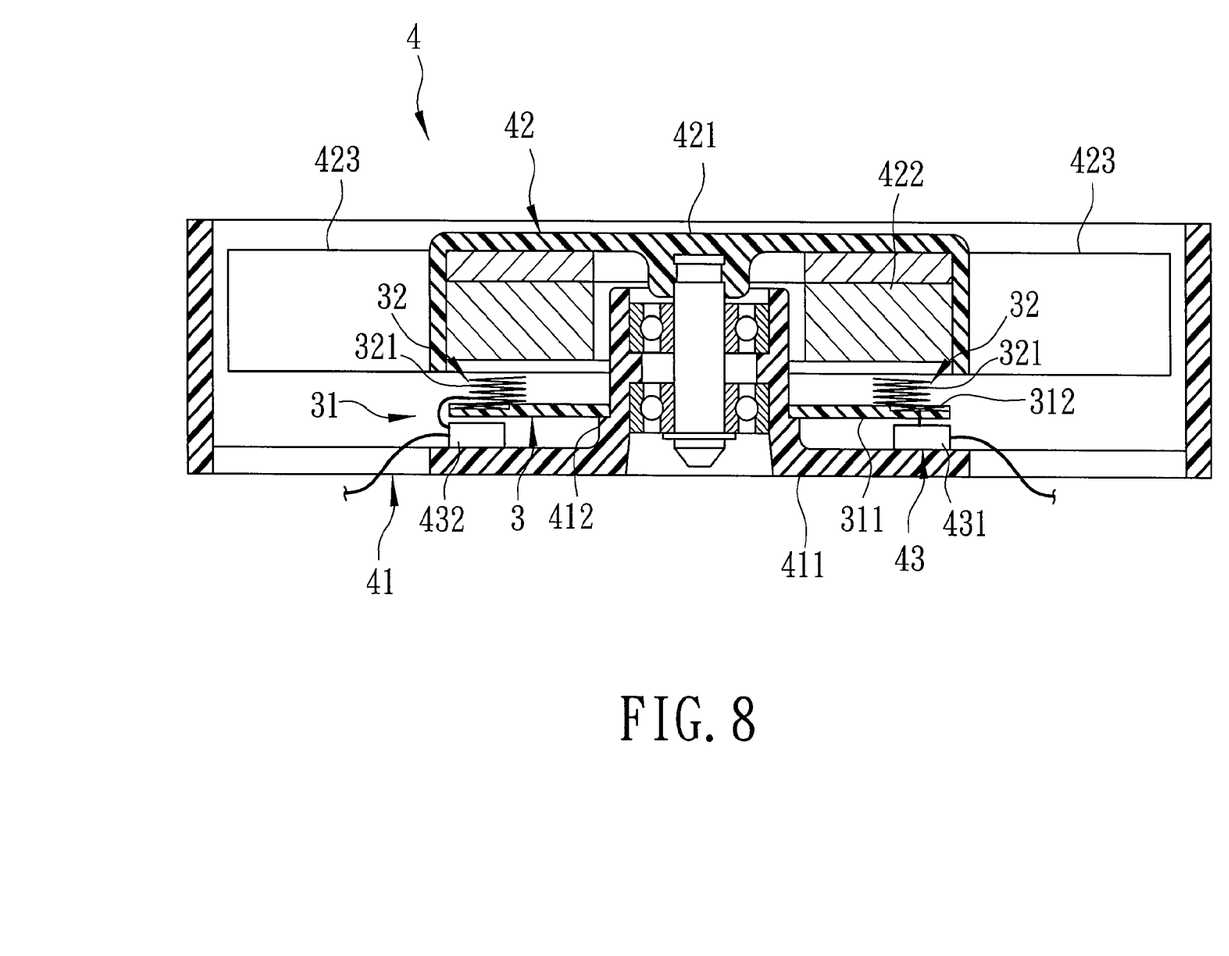
FIG. 8 is a sectional view of a heat-dissipating fan incorporating the third preferred embodiment.

With further reference to FIG. 8, in this embodiment, the motor stator 3 is also used on a heat-dissipating fan 4. The fan 4 includes a driving power source 431 that is electrically connected to the induction coils 312, and a starting power source 432 that is electrically connected to the auxiliary coils 321.

During use, the starting power source 431 is first turned on to energize the auxiliary coils 321 for inductive excitation. At this time, since the auxiliary coils 321 are exposed outwardly of the circuit substrate 311, the turn numbers of the auxiliary coils 321 are not limited by the area and thickness of the circuit substrate 311, and can be increased. Hence, a magnetic field having an enhanced intensity is generated to provide a repulsive magnetic force that is large sufficient to drive fully rotation of the hub 421. As soon as the hub 421 rotates, the starting power supply 42 is turned off, and the driving power source 431 is turned on to energize the induction coils 312, so as to maintain rotation of the hub 421.

Figure 9:
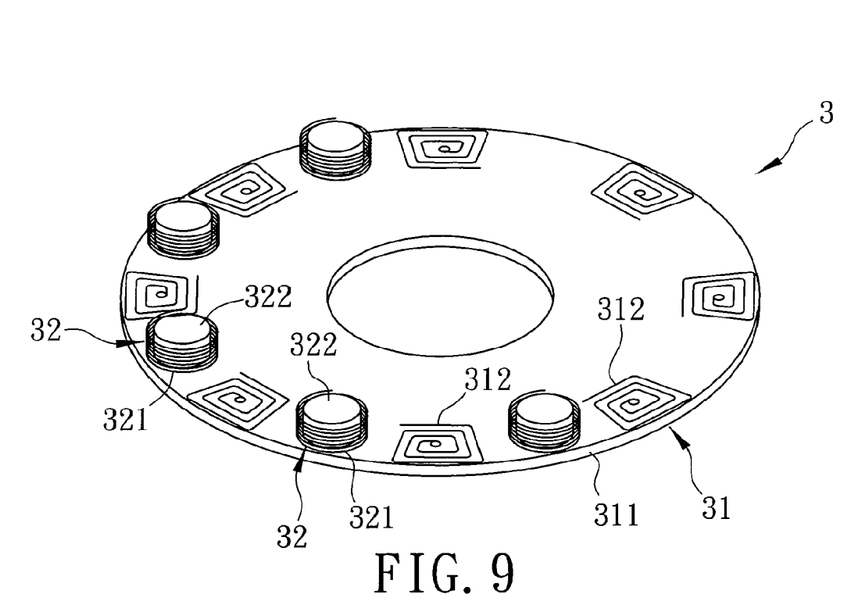
FIG. 9 is a perspective view of the fourth preferred embodiment of a motor stator according to this invention.

FIG. 9 shows the fourth preferred embodiment of a motor stator 3 according to this invention, which is similar in construction to the third preferred embodiment. Unlike the third preferred embodiment, each of the auxiliary units 32 further includes a conductive rod 322 disposed fixedly on and perpendicular to the side surface of the circuit substrate 311 and permitting the corresponding auxiliary coil 321 to be wound therearound.

Figure 10:
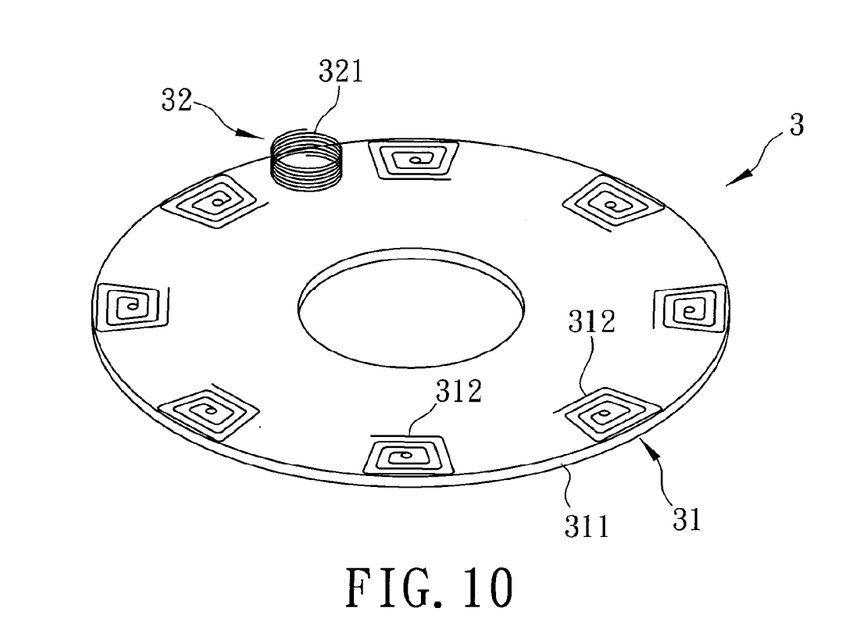
FIG. 10 is a perspective view of the fifth preferred embodiment of a motor stator according to this invention.

FIG. 10 shows the fifth preferred embodiment of a motor stator 3, which is similar in construction to the third preferred embodiment, except that the motor stator 3 includes only one auxiliary unit 32. Although only one auxiliary unit 32 is included in the motor stator 3, the turn number of the auxiliary coil 321 is not limited by the area and thickness of the circuit substrate 311, and can be increased to a desired number such that a magnetic field thus generated has a sufficient large intensity to drive rotation of the rotor unit 42 (see FIG. 8).

Since only one auxiliary coil 321 is provided, the manufacturing costs of the motor state 3 can be reduced.

Figure 11:
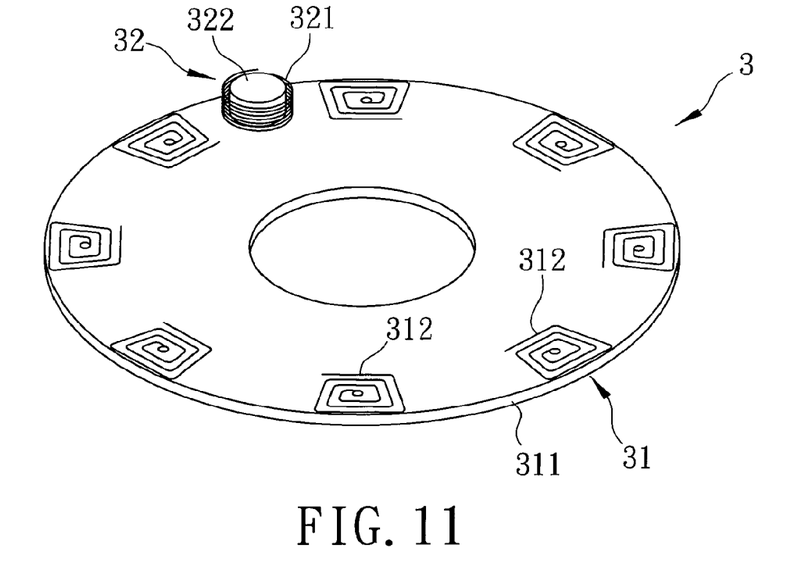
FIG. 11 is a perspective view of the sixth preferred embodiment of a motor stator according to this invention.

FIG. 11 shows the sixth preferred embodiment of a motor stator 3 according to this invention, which is similar in construction to the fifth preferred embodiment. In this embodiment, the auxiliary unit 32 further includes a conductive rod 322 disposed fixedly on and perpendicular to the side surface of the circuit substrate 311.

Figure 12:
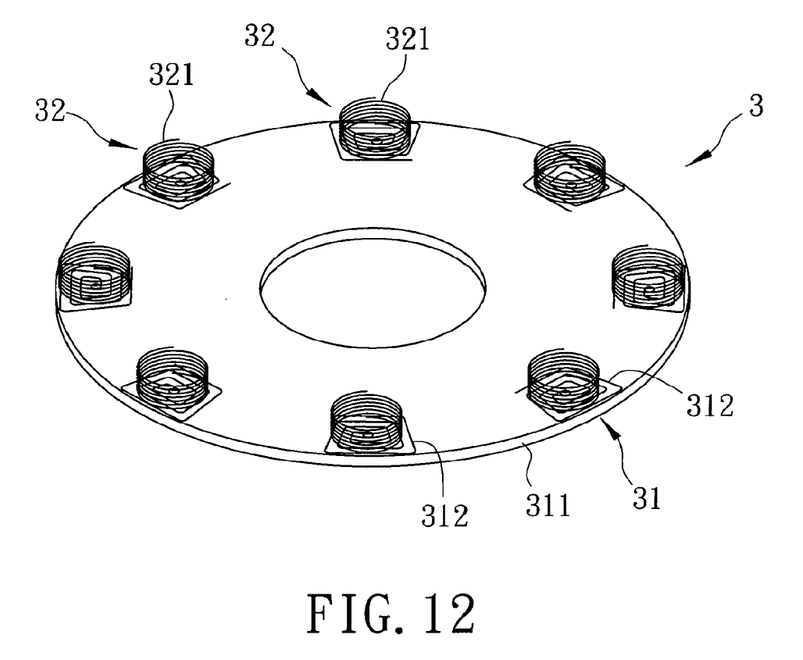
FIG. 12 is a perspective view of the seventh preferred embodiment of a motor stator according to this invention.

FIG. 12 shows the seventh preferred embodiment of a motor stator 3 according to this invention, which is similar in construction to the first preferred embodiment. In this embodiment, the auxiliary coils 321 of the auxiliary units 32 are disposed on and electrically connected to the induction coils 312, respectively. Each of the auxiliary coils 321 cooperates with the corresponding induction coil 312 to constitute a coil set.

As such, total turn number of each of the coil sets is relatively large to increase the magnetic field intensity to thereby enhance the driving force (i.e., the repulsive magnetic force).

In view of the above, since the auxiliary coil or coils 321 can be disposed outwardly of the circuit substrate 311, the coil turn number or numbers can be increased to enhance the magnetic field intensity, or the magnetic pole slot number can be increased to improve the driving force of the motor stator 3, thereby promoting the performance of a motor including the motor stator 3.

With this invention thus explained, it is apparent that numerous modifications and variations can be made without departing from the scope and spirit of this invention. It is therefore intended that this invention be limited only as indicated by the appended claims.

We claim:
1. A motor stator comprising:
a stator unit including a circuit substrate, and a plurality of spaced-apart induction coils embedded within said circuit substrate; and
at least one auxiliary unit including an auxiliary coil attached to and disposed outwardly of said circuit substrate.

2. The motor stator as claimed in claim 1, wherein said auxiliary unit further includes a conductive rod disposed fixedly on said circuit substrate, said auxiliary coil being wound around said conductive rod.

3. The motor stator as claimed in claim 1, wherein said auxiliary coil is electrically insulated from said induction coils.

4. The motor stator as claimed in claim 1, wherein said motor stator comprises a plurality of said auxiliary units.

5. The motor stator as claimed in claim 4, wherein each of said auxiliary units further includes a conductive rod disposed fixedly on said circuit substrate and permitting said auxiliary coil of a corresponding one of said auxiliary units to be wound therearound.

6. The motor stator as claimed in claim 4, wherein said auxiliary coils of said auxiliary units correspond respectively to said induction coils, and are electrically connected to said induction coils.

7. The motor stator as claimed in claim 4, wherein said auxiliary coils of said auxiliary units correspond respectively to said induction coils, and are electrically insulated from said induction coils.

8. The motor stator as claimed in claim 4, wherein the number of said auxiliary coils of said auxiliary units is different from that of said induction coils, and are electrically insulated from said induction coils.

9. The motor stator as claimed in claim 4, wherein said auxiliary coils of said auxiliary units are disposed on and electrically connected to said induction coils, respectively.

\* \* \* \* \*